(12) United States Patent
Charpentier

(10) Patent No.: US 6,943,923 B2
(45) Date of Patent: Sep. 13, 2005

(54) ADAPTIVE TECHNOLOGY FOR AUTOMATIC DOCUMENT ANALYSIS

(75) Inventor: Didier Charpentier, Aigues Mortes (FR)

(73) Assignee: Itesoft S.A., Aimargues (FR)

( * ) Notice: Subject to any disclaimer, the term of this patent is extended or adjusted under 35 U.S.C. 154(b) by 305 days.

(21) Appl. No.: 10/148,586

(22) PCT Filed: Dec. 4, 2000

(86) PCT No.: PCT/FR00/03379

§ 371 (c)(1),
(2), (4) Date: Oct. 10, 2002

(87) PCT Pub. No.: WO01/41050

PCT Pub. Date: Jun. 7, 2001

(65) Prior Publication Data

US 2003/0108243 A1 Jun. 12, 2003

(30) Foreign Application Priority Data

Dec. 2, 1999 (FR) .......................... 99 15306

(51) Int. Cl.⁷ ............................................. H04N 1/04
(52) U.S. Cl. ..................................... 358/474; 382/217
(58) Field of Search ................................ 382/112, 139, 382/137, 179, 180, 209, 217; 355/474, 1.18, 1.12

(56) References Cited

U.S. PATENT DOCUMENTS

| | | | | |
|---|---|---|---|---|
| 3,643,069 A | | 2/1972 | Yoshiyasu | 235/454 |
| 4,481,665 A | | 11/1984 | Ota | 382/102 |
| 5,134,669 A | * | 7/1992 | Keogh et al. | 382/318 |
| 5,235,654 A | * | 8/1993 | Anderson et al. | 382/180 |
| 5,416,849 A | * | 5/1995 | Huang | 382/173 |
| 5,721,940 A | * | 2/1998 | Luther et al. | 715/506 |
| 5,848,186 A | * | 12/1998 | Wang et al. | 382/176 |
| 5,983,246 A | * | 11/1999 | Takano | 715/514 |
| 6,201,894 B1 | * | 3/2001 | Saito | 382/176 |
| 6,400,845 B1 | * | 6/2002 | Volino | 382/176 |
| 2001/0014176 A1 | * | 8/2001 | Kamada et al. | 382/181 |
| 2002/0044688 A1 | * | 4/2002 | Naoi et al. | 382/190 |
| 2002/0141660 A1 | * | 10/2002 | Bellavita et al. | 382/309 |
| 2002/0181777 A1 | * | 12/2002 | Sumikawa et al. | 382/202 |

FOREIGN PATENT DOCUMENTS

| | | | |
|---|---|---|---|
| EP | 0 517 297 | 12/1992 | G06K/9/80 |
| EP | 0 519 713 | 12/1992 | G06K/9/20 |
| EP | 0 616 296 A2 | 9/1994 | G06K/9/20 |
| EP | 0758775 * | 2/1997 | G06K/9/20 |
| EP | 0 772 142 | 5/1997 | G06F/17/60 |
| WO | 92 06447 | 4/1992 | G06K/9/32 |
| WO | 98/47098 | 10/1998 | G06K/9/20 |
| WO | WO01/41050 * | 7/2001 | G06K/9/20 |

OTHER PUBLICATIONS

Fast Technique for Finding the Amount Field, IBM Technical Disclosure Bulletin, US, IBM, Corp. New York, vol. 37, No. 1, 1994, pp. 167–168, XP000428730, ISSN: 0018–8689, Whole Document.

K. Kerchmar: "Amount Line Finding Logic", IBM Tech. Disclosure Bulletin, vol. 15, No. 5, Oct. 1972, pp. 1531–1532, XP002145497, Whole Document.

* cited by examiner

Primary Examiner—Jerome Grant, II
(74) Attorney, Agent, or Firm—Young & Thompson (57) ABSTRACT

A device for automatic document reading includes an image sensor for imaging the document and an output for data from the document and data concerning meanings of at least part of the scanned data. The device further includes parts for detecting at least a scanning guide and means associating at least a scanned information with an information of meaning using the scanning guide.

14 Claims, 8 Drawing Sheets

ADAPTIVE TECHNOLOGY FOR AUTOMATIC DOCUMENT ANALYSIS

BACKGROUND OF THE INVENTION

The invention described herein concerns a process and device for automatic document reading.

DESCRIPTION OF THE RELATED ART

The usual approaches to automatic document or form reading require a parameterization operation which defines the data to be read by the coordinates along two axes, X and Y, of the zones to be processed, that is the zones that might contain symbols to be recognized. Also, with each variation in document format, even if the variation is slight, it is necessary to reset the parameters. This parameterization is more and more complex as the document itself increases in complexity.

When a document whose format is defined electronically, for example by being transmitted on a telecommunications network such as the Internet, is printed, the positions of the zones to be processed vary according to the software program used (word processor, drawing application), the printer used, and more generally the configuration of the users computer system. Because of these variations, the automatic reading of this document is therefore made difficult, or even impossible.

Document WO 98/47098 (PCT/SE 98/00602) presents a method for automatic data acquisition in which an unknown form is digitized with a scanner and lines are located on this form to identify it from among all the different possible documents. However, the identification of the document does not avoid all the disadvantages described above.

SUMMARY OF THE INVENTION

The invention described herein aims to overcome these disadvantages. For that reason, this invention proposes a device and process for automatic document reading.

According to a first aspect, the invention described herein proposes a device for automatic document reading comprising:

a document image capture device adapted for providing an image of the aforementioned document and a means of output for the information read on the aforementioned document and information whose signification is deduced from at least part of the aforementioned read information, characterized by what it comprises, including the following:

a means of detecting at least one reading guide and a means for associating at least one piece of information read to a piece of information whose signification is deduced from the read information, which implements the aforementioned reading guide.

By means of this set-up, the reading is guided and the information read is associated to a piece of information whose signification is deduced from the read information thanks to this guidance. The extraction of useful information is thus guided according to the logical structure of a class of documents (documents whose contents are similar, but differently localized) rather than by the physical structure of the document.

In accordance with the particular characteristics of the device as they are briefly described above:

it includes a means of saving at least one positioning constraint for at least one field of the aforementioned document, a field in which a piece of information might be read, the means of detection is adapted for detecting the compliance with at least one positioning constraint of at least one piece of read information, the means of association is adapted for associating to each piece of information read that complies with one of the aforementioned constraints a piece of information whose signification is deduced from the read information representative of the presence of that constraint.

By means of this set-up, the device can read documents in which the information fields are specified by a constraint rather than by an absolute position. For example, information fields may be located using the respective positions of the fields, the respective positions of the headings and the approximate positions of fields.

In accordance with the particular characteristics of the device briefly presented above:

this device includes a means for saving at least one graphic characteristic of at least one field of the aforementioned document, a field in which a piece of information might be read, the means of detection is adapted for detecting at least one field of the document that has one of the above graphic characteristics, the means of association is adapted for associating to each piece of information read that is in a field having such a graphic characteristic a piece of information whose signification is deduced from the read information, which is representative of presence of the aforementioned graphic characteristic, By means of this set-up, graphic characteristics such as lines, columns, frames, boxes, hatching, colors, grayscale or combs make it possible to identify the fields of information to be read.

In accordance with the particular characteristics of the device briefly presented above:

it includes a means for saving at least one heading from at least one field of the aforementioned document, a field in which a piece of information might be read, the means of detection is adapted for reading at least one such heading, the means of association is adapted for associating to each piece of information read in a field having such a heading, a piece of information whose signification is deduced from the read information, which is representative of the aforementioned heading.

By means of this set-up, written headings, such as form numbers, or box titles, make it possible to specify the signification of the information to be read.

In accordance with the particular characteristics of the device briefly presented above:

it includes a means for saving at least one information content constraint for at least one field of the aforementioned document, a field in which a piece of information might be read, the means of detection is adapted for reading the content of at least one of the fields of the aforementioned document, the means of association is adapted for associating to each piece of information read in a field that complies with the content constraint, a piece of information whose signification is deduced from the read information, which is representative of that content.

By means of this set-up, information read can be identified using key words, such as "last name", "first name", "age", "social security number", and <<tax excl.", "tax incl."

According to a second aspect, the invention described herein relates to a process for automatic document reading that includes:

a document image capture operation and an output operation for information read in the aforementioned document and for information whose signification is deduced from at least part of the aforementioned read information, characterized by what it comprises, including the following:

a detection operation for at least one reading guide and an operation associating at least one piece of information read to a piece of information whose signification is deduced from the read information, which implements the aforementioned reading guide.

Since this process has the same particular characteristics and the same advantages as the device briefly presented above, they will not be restated here.

The invention described herein also relates to a scanner and a computer adapted to implement the process concerned by the invention described herein or to include the device concerned by this invention.

BRIEF DESCRIPTION OF THE DRAWINGS

Other advantages, goals and characteristics of the invention described herein will be highlighted in the following description intended to explain them, but which should in no way be considered exhaustive, with respect to the appended drawings in which.

DESCRIPTION OF THE PREFERRED EMBODIMENTS

Figure 1:
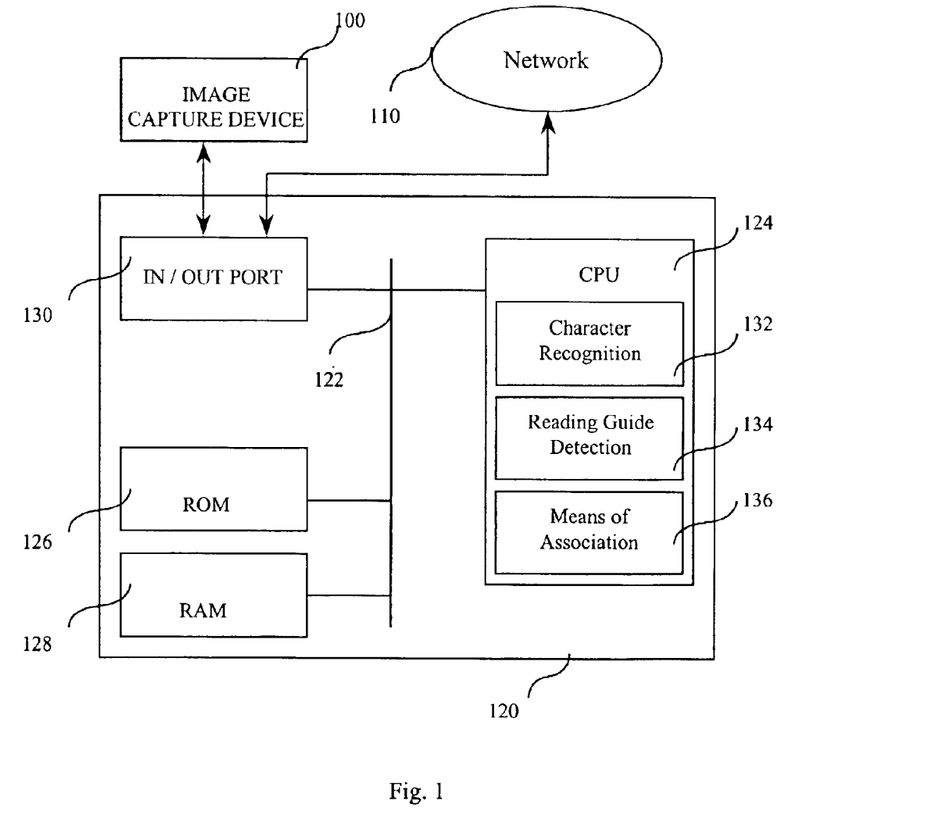
FIG. 1 is a functional diagram that represents a first way in which the device concerned by the invention described herein is implemented.

FIG. 1 shows an image capture device 100, an automatic document reading device 120, and a computer network connection 110.

The image capture device 100 is adapted to providing an electronic signal representing the shapes and colors added to a document: for instance, a form filled out manually by a user. For example, the image capture device 100 is a known type of scanner. The connection to the computer network 110 is of a known type. It transmits document content information once the automatic document reading device has processed the signal relayed by the capture device 100.

The automatic document reading device 120 includes the following interlinked items: a data and control bus 122, a central processing unit 124, a non-volatile memory (ROM) 126, a random access memory 128, and an input/output port 130, which is itself linked to the capture device 100 on the one hand, and to the network line 110 on the other. As an example, the reading device 120 can be set up by programming a typical personal computer. The reading device can also be created on a printed circuit comprised of a processor or a controller, a specific circuit, and a pin grid array or in an integrated circuit. All these ways in which the process are carried out are familiar to specialists in the field of electronic circuits and are therefore not described in further detail here.

The central processing unit 124 is comprised of a character reading circuit 132, a detection circuit for at least one reading guide 134 and a means for associating 136 at least one piece of information read by the character reading circuit to one piece of information whose signification is deduced from that information read. The means of association implements at least one reading guide for associating to a piece of read information a piece of information whose signification is deduced from the read information.

Thus, the reading device 120 transmits part of the information that was read on the document on the computer network line 110. For example "Géraldine", "Pacaut" and, on the other hand, information whose signification is deduced from the read information, which indicates that the first word corresponds to a first name and the second word to a last name. It should be noted, however, that the information whose signification is deduced from the read information may be implicit. For example, when the order in which each piece of information read on a document is transmitted on the network is predefined by a communication protocol. It may also be explicit, when a predefined identifier is associated to each piece of information, or mixed when an identifier is associated to at least one piece of information.

The way in which the information transmitted on the computer network line 110 is used does not relate to the invention described herein. It should be noted, however, that all or part of the information read can be archived in a database, processed, displayed, translated, printed, sorted, added to or destroyed, or, for each piece of information, a combination of these operations.

Generally speaking, the automatic document reading device 120 is adapted to implement each of the ways in which the process is carried out and the different aspects of the processed concerned by the invention described herein, as presented in relation to FIGS. 2 to 8.

Figure 2:
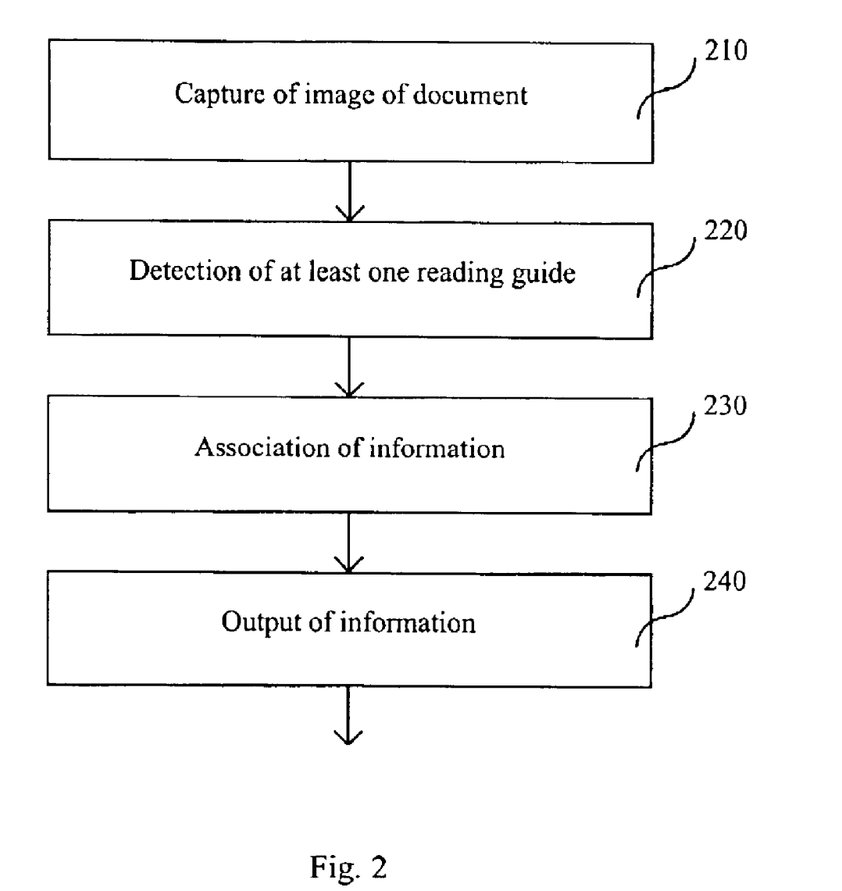
FIG. 2 is a schematic representation of a sequence of operations implemented according to one aspect of the process concerned by the invention described herein.

FIG. 2 represents schematically a sequence of operations implemented for one aspect of the process concerned by the invention described herein.

In FIG. 2, it should be noted that automatic document reading includes:

a document image capture operation 210, a detection operation for at least one reading guide 220, an operation in which at least one piece of information read is associated to a piece of information whose signification is deduced from the read information that implements the aforementioned reading guide 230, and an output operation for information read on the aforementioned document and information with whose signification is deduced from at least part of this information read 240.

The document image capture operation 210 consists in capturing an image of a document and creating a piece of information representative of the aforementioned image. The operation for detecting at least one reading guide 220 consists in detecting a reading guide on the document of which an image is captured during the operation 210. The detection is performed by processing the document image information. It should be noted that this reading guide does not vary with the document and supports some variations in the way the document is laid out and filled out and in the document image capture. In addition, this guide is extracted from the processing of the image and therefore depends on the image contents. Thus, the reading guide is not a piece of information concerning a position that has pre-set Cartesian coordinates before the document is read.

The operation in which at least one piece of information read is associated to a piece of information whose signification is deduced from the read information that implements the reading guide 230 consists in reading a piece of information by processing the image information and associating a piece of information whose signification is deduced from read information to the information read, in function of the reading guide.

The output operation for information read on the aforementioned document and information whose signification is deduced from at least part of this information read 240, consists in transmitting the data read and the data whose signification is deduced from the read data (at least implicitly for the information whose signification is deduced), to prepare for processing, storing, displaying, completing, printing, sorting, transmitting or destroying them.

Figure 3:
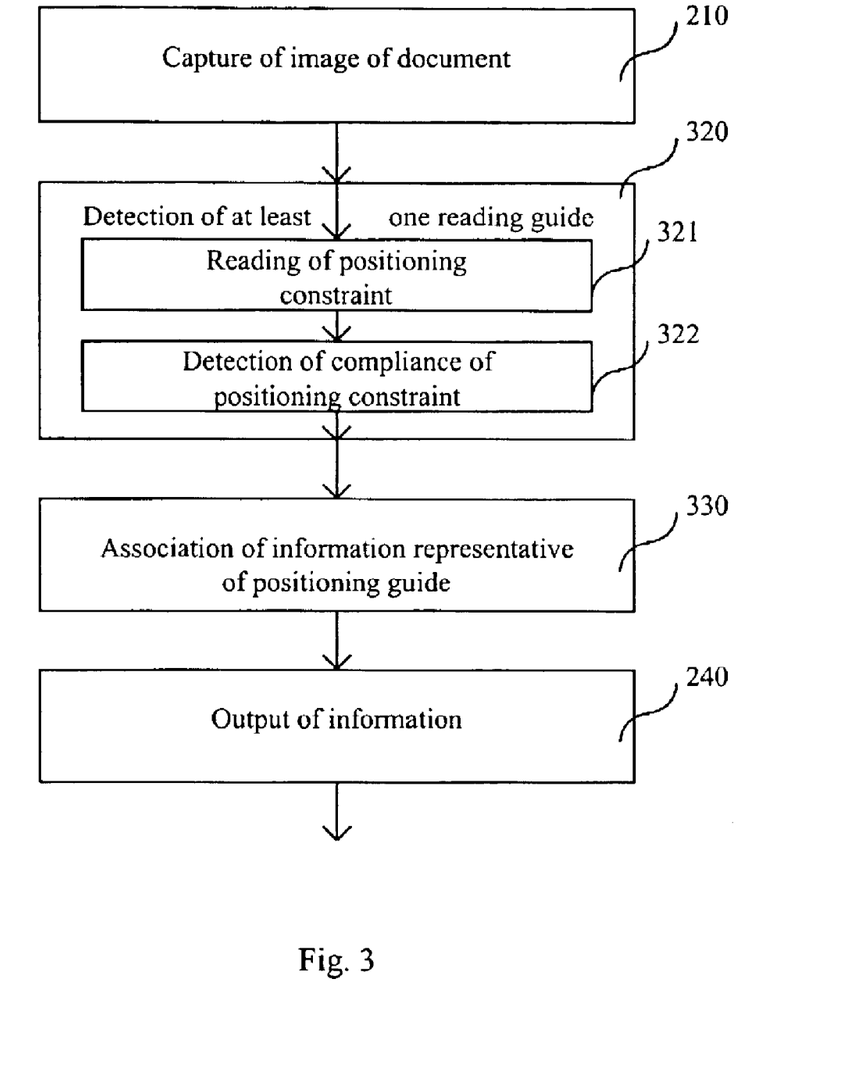
FIG. 3 is a simplified flowchart that represents one way in which the process concerned by the invention described herein is carried out.

In the way in which the process concerned by the invention described herein is carried out, represented in FIG. 3 as a simplified flowchart, can be found the operations of document image capture 210, detection of at least one reading guide 320, associating at least one piece of information read to a piece of information whose signification is deduced from the read information that implements the reading guide 330, and an output for information read on the document and information whose signification is deduced from at least part of this information read 240.

The operation for detecting a reading guide 320 includes one reading operation for at least one positioning constraint for at least one field of the aforementioned document 321, a field in which a piece of information might be read, and a detection operation in which at least one positioning constraint may be complied with for at least one piece of information read 322. Each positioning constraint mentioned here is a relative positioning constraint for different pieces of information read on the document. Such a constraint is expressed, for example, by "the name is above the address", "the total tax excl. precedes the total tax incl.", "the number representing the month and the number representing the day precede the number representing the year."

During the association operation 330, a piece of information whose signification is deduced from read information representative of such constraint is associated to each piece of information read that complies with the aforementioned constraint. Therefore, the piece of information "99" read in the block of information "02/25/99" is associated to a piece of information that signifies "year" because it is preceded by a number, "25" that can be associated to the day and a number "02" that can be associated to the month.

In this way, documents in which information fields are specified by positioning constraints and not by absolute positioning are read. For example, the respective positions of the fields, the respective positions of the headings, and the approximate positions of fields make it possible to locate them.

Figure 4:
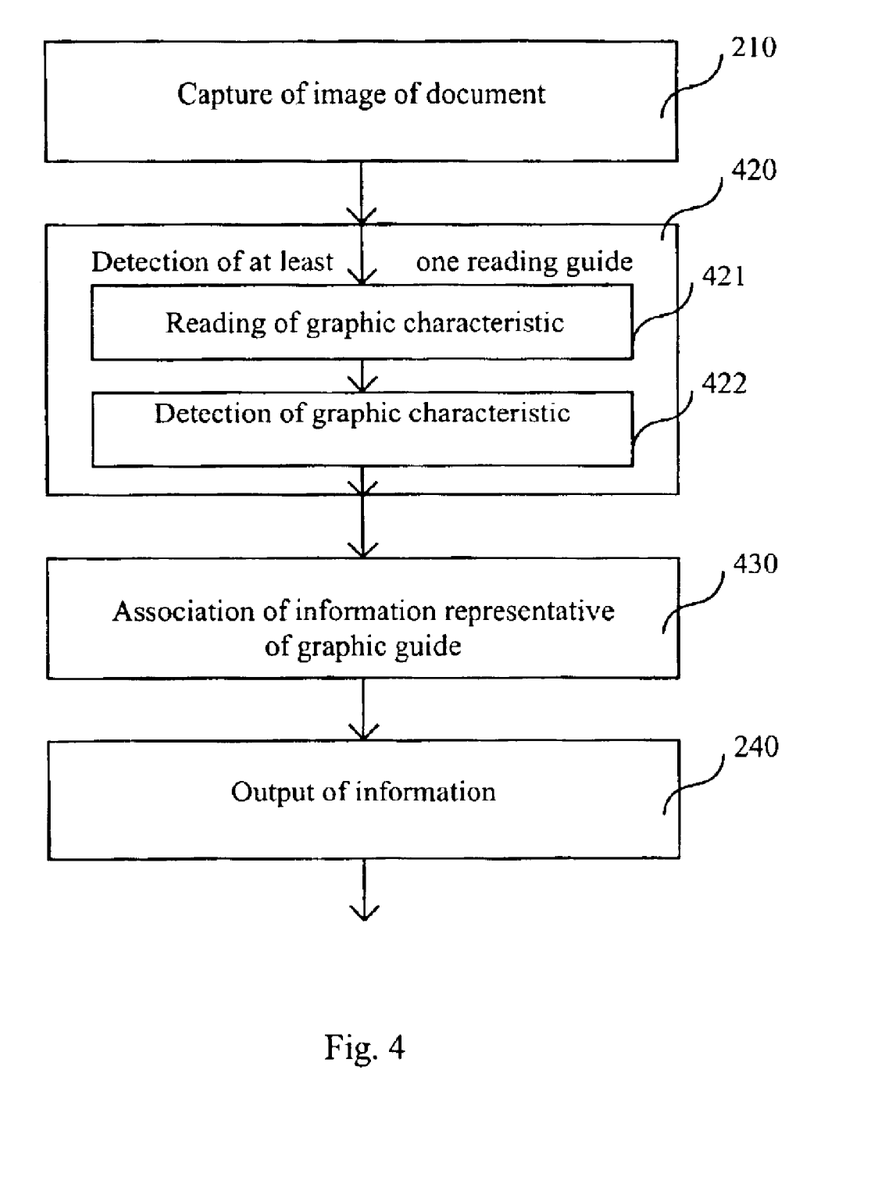
FIG. 4 is a simplified flowchart that represents a second way in which the process concerned by the invention described herein is carried out.

In the way in which the process that concerns the invention described herein is carried out, represented as a simplified flowchart in FIG. 4, can be found operations of document image capture 210, detection of at least one reading guide 420, associating at least one piece of information read to a piece of information whose signification is deduced from the read information that implements this reading guide 430, and of output information read on the document and information whose signification is deduced from at least part of this information read 240.

The operation for detecting a reading guide 420 includes a reading operation for at least one graphic characteristic of at least one field of a document 421, a field in which a piece of information might be read, and a detection operation for a field that may present a graphic characteristic 422. Each graphic characteristic mentioned here is a characteristic of shape, color, item, line, etc. For example, there is a thick horizontal line above the total in an invoice, an address is placed in a rectangular frame, the responses to multiple choice questionnaires are in square boxes, the age of the person filling out the form appears against a yellow or hatched background, the date contains two forward slashes, etc.

During the association operation 430, to each piece of information read in a field that has one of the aforementioned graphic characteristics is associated a piece of information whose signification is deduced from the read information that is representative of the presence of that characteristic. In the examples presented above, a piece of information placed against a yellow or hatched background is associated to the signification "age", a piece of information read in a rectangular frame is associated to the signification "address" etc.

Thus, creating a document to be filled out is simple. Graphic characteristics, such as lines, columns, frames, check boxes, hatching, colors, grayscale or combs make it possible to identify the information fields to be read.

Figure 5:
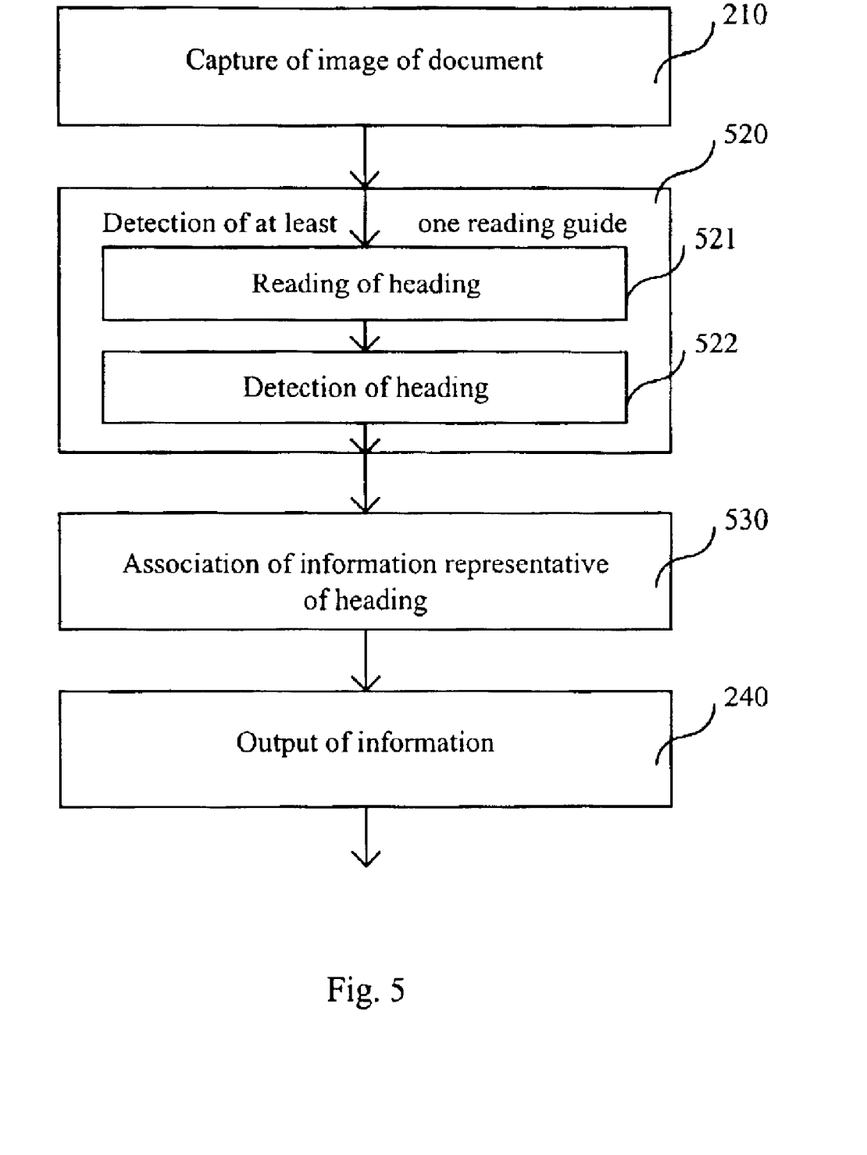
FIG. 5 is a simplified flowchart that represents a third way in which the process concerned by the invention described herein is carried out.

In the way in which the process that concerns the invention described herein is carried out, represented as a simplified flowchart in FIG. 5, can be found operations of document image capture 210, detection of at least one reading guide 520, associating at least one piece of information read to a piece of information whose signification is deduced from the read information that implements this reading guide 530, and of output information read on the document and information whose signification is deduced from at least part of this information read 240.

The operation for detecting a reading guide 520 includes a reading operation for at least one heading of at least one field of the aforementioned document 521, a field in which a piece of information might be read, and a reading operation for a possible heading 522.

Each heading mentioned here is a sequence of at least one symbol that identifies a field. For example, the heading can be limited to:
- a written number of very small dimensions (for example less than half the height of the symbols of the information read,
- a series of points the number of which represents the heading,
- a number of hatch marks,
- a number of places for symbols of information (for example a first name on a line where fifteen symbols are pre-marked, a last name on a line in which twenty symbols are pre-marked, an address on a line with more than twenty symbols, an age on a line with three place for symbols, a social security number in a sequence of exactly thirteen symbols (French standard), etc.), one or more words (for example the word "last name" associated to the field in which the person filling out the form should write his or her last name, etc.).

During the association operation 530, a piece of information whose signification is deduced from read information representative of a heading is associated to each piece of information read in a field having that heading.

It is thus simple to create a document to be filled out. Headings whose signification is deduced from read information are attached to fields for the information to be read.

Figure 6:
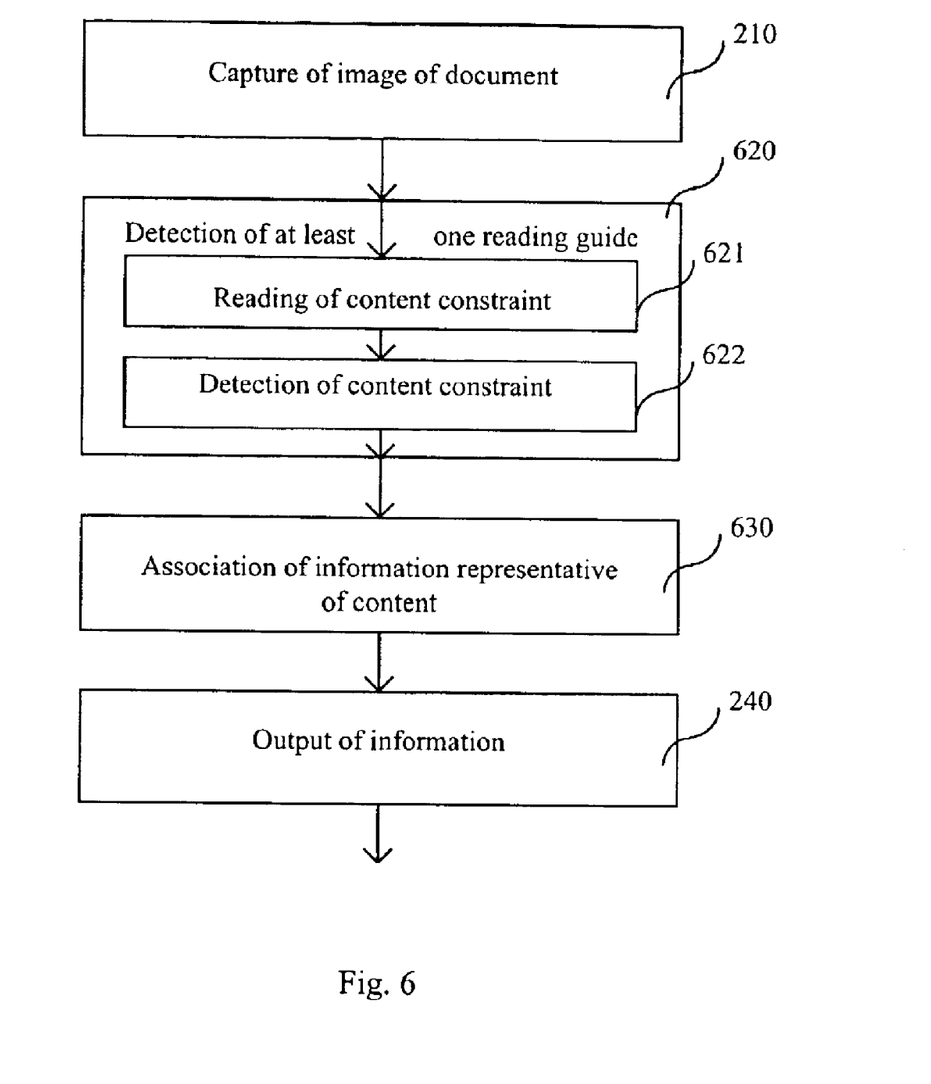
FIG. 6 is a simplified flowchart that represents a fourth way in which the process concerned by the invention described herein is carried out.

In the way in which the process that concerns the invention described herein is carried out, represented as a simplified flowchart in FIG. 6, can be found operations of document image capture 210, detection of at least one reading guide 620, associating at least one piece of information read to a piece of information whose signification is deduced from the read information that implements this reading guide 630, and of output information read on the document and information whose signification is deduced from at least part of this information read 240.

The operation for detecting a reading guide 620 includes one reading operation for at least one information content constraint concerning at least one field of the document 621, a field in which a piece of information might be read, and a content reading operation concerning at least one of the fields of the aforementioned document 622.

Herein, content signifies the semantics of the information. For example a number of less than three digits is the sign of an age content. A sequence of more than three words combined with numbers and including a 5-digit number is an address. A sequence of thirteen digits is a social security number (French standard).

During the association operation 630, to each piece of information read in a field that complies with one of the aforementioned content constraints is associated a piece of information whose signification is deduced from the read information representative of that content.

By means of this set-up, relatively unstructured forms can be processed.

Figure 7:
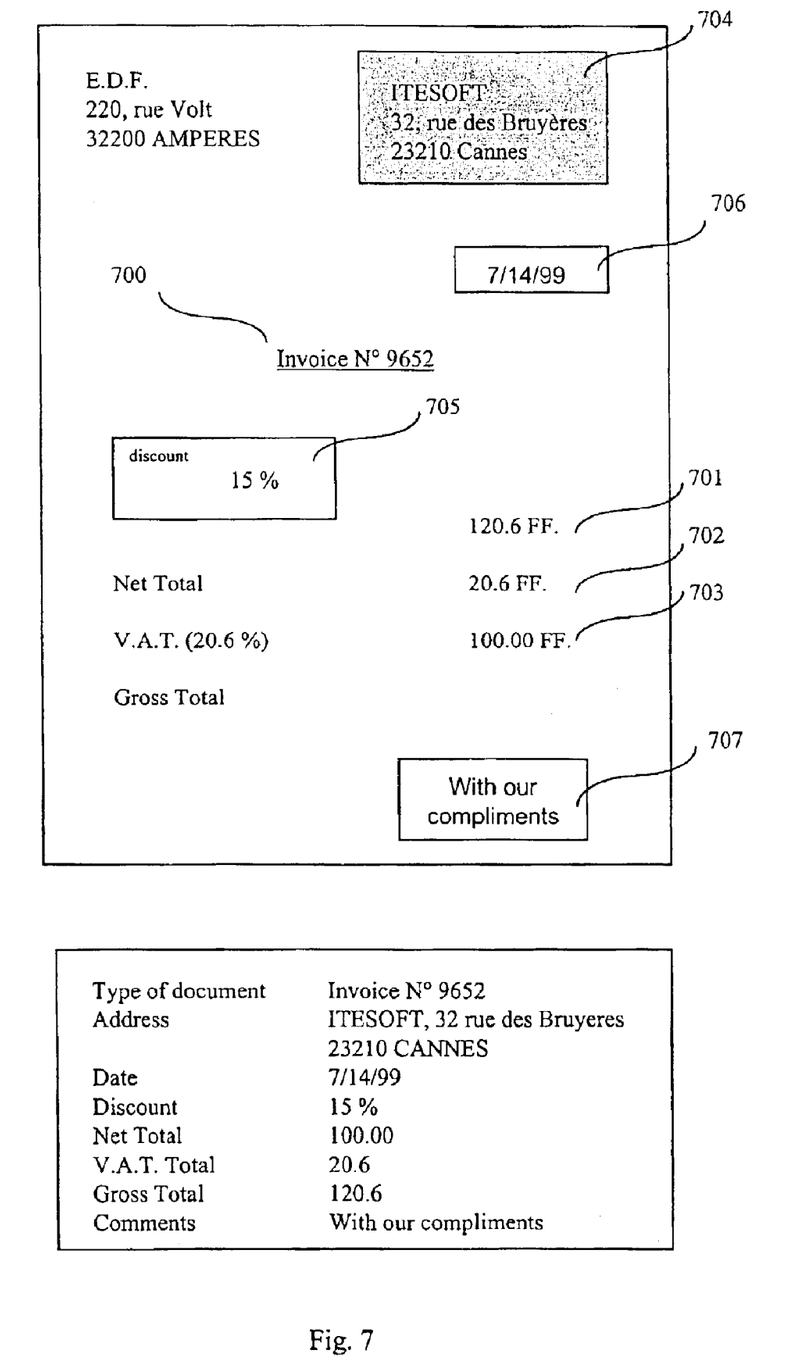
FIG. 7 represents a document on which the four ways of carrying out the process illustrated in FIGS. 3 to 6 are implemented.

FIG. 7 represents a document implementing the four ways in which the processed can be carried out, as illustrated in FIGS. 3 to 6. The upper part represents the image of a document and the lower part a file of information and deduced significations completed on the basis of the aforementioned image.

Field 700 shows the positioning constraint of being centered within the document, with respect to the side edges (right and left) of the document. Implementing the invention in the way illustrated in FIG. 3 makes it possible to identify the information associated to the signification "document type".

Fields 701 to 703 show positioning constraints in accordance with the way in which the process is carried out illustrated in FIG. 3. Although the totals are not at all lined up with their headings ("total excl. tax", "total tax>>" and "total incl. tax"), the sequence in which they are in helps to determine the information whose signification is deduced from read information that must be assigned to them.

In addition, fields 701 to 703 show one content constraint, since the smallest of the three totals is the VAT total, and the greatest is the tax incl. total. Thanks to this constraint, although the totals were not placed in the correct order, the way in which the invention described herein is carried out, illustrated in FIG. 6, attributes the normal signification to each of them.

Field 704, which has a shaded background, corresponds to an address. In accordance with the way in which the process is carried out, illustrated in FIG. 4, the deduced signification of the information read in this field is determined by this background, which constitutes a graphic guide.

Field 705 contains a written heading "discount," which makes it possible to identify the deduced signification of the information read in this field, in accordance with the way in which the process is carried out, as illustrated in FIG. 5.

Field 706 contains two forward slashes and the information read therein is associated to a date in accordance with the way in which the process is carried out, as illustrated in FIG. 4.

Finally, field 707 presents a content "with our compliments", which corresponds to a polite expression, and is therefore associated to a comment in accordance with the way in which the process is carried out, as illustrated in FIG. 6.

It should be noted that the signification of some information read can be determined according to several ways of carrying out the process that is the object of the invention described herein. For example, a date that contains three 2-digit numbers separated by slashes can be identified by a graphic characteristic, the two slashes, or its content: three times two digits.

In the remainder of the description, the following definitions are used:

"family" concerns a set of documents that meet the criteria of being approximately alike. For each family, more general rules, which are less precise and more approximate than the simple plane coordinates of the zones to be read, make it possible to describe the document and the zones to be processed.

For example:

Half of the goods exchange declarations used by the French Customs are "cerfa" documents, and half are documents printed by the companies filing the declarations. These declarations constitute a family because the information in the header is always in approximately the same place, and the columns are in the same order on almost all the declarations.

The purchase orders used by mail-order sales companies often change for sales and marketing reasons. However, the nature of the useful information contained in these forms is always the same. In addition, this information is organized in blocks of information. These blocks can be addresses, lists of items ordered, means of payment, etc.

The supplier invoices received by a company are all different because each supplier prints its invoice in a particular way. However, the zones to be processed concern, at least, the total tax excl., the total of the Value Added Tax, the total tax incl., the date and the item number.

A "form" is a group of one or more pages. Each page can be broken down into one or more blocks.

Each "block" contains graphic elements (horizontal lines, vertical lines, frames, logos, images, etc.), textual elements (headings and identification labels, various text, etc.) as well as fields and zones to be read.

Each "element" is defined by characteristics whose degree of tolerance must represent all the possible variations within the family.

Certain documents or families of documents contain specific objects that make it possible to locate the data to be extracted in a general and global manner.

For example, a textual heading is often followed by the value of the field, on a line, in a frame, in a check box or series of check boxes, or with no graphic guide. For example, in a frame, the heading, if there is one, is often in the upper left-hand corner. The response fields on questionnaires are often rectangular graphic objects. Column headings are often at the beginning of columns, at the top.

Thus, the analysis of the image extracts all the elements that make it possible to identify the document (graphic objects, lines, frames, headings, logos, etc.). Identifying the page makes it possible to associate to the image to be processed the template of the document, which describes the page structure.

The elements defined in the page structure are compared to those found or searched for in the image. This search is performed within the limits of their characteristics (tolerances concerning the positions, relative variations, similar character strings, etc.), and results in a segmentation hypothesis.

This segmentation hypothesis makes it possible to locate with precision the fields to be processed and to extract the images from these fields for the subsequent steps.

The logical definition of the field (last name, type, consistency check, etc.) and of the physical field found on the page are performed on the basis of the absolute physical position of the position with respect to another field and/or its association with a heading (company, etc.).

The utilization of specific objects facilitates the parameterization of documents because the automatic analysis of the page localizes all the objects that meet the characteristics being searched for, verifies the constraints expressed and extracts the fields to be read with no complex segmentation of the page.

It should be noted that the adaptive process developed for processing variable formats offers exceptional robustness and flexibility for all the shapes due to slips and other printing anomalies found in document processing.

Like the human eye, adaptive technology uses "natural" or intuitive graphic characteristics, content, headings, field (or zone) titles, or relative positions to identify the information contained in each field.

The analysis and the segmentation of the page is based on logical rules, e.g., total columns on the bottom of the page, definition of the type of column depending on its order, heading associated to the field, etc.), independently of the precise physical position as represented by planar coordinates.

The utilization of adaptive technology makes it possible to define a single template for a family of documents, and therefore all the physical variations of the same logical description. This template associates the fields and their identifiers to characteristics that are not too constraining for document designers, but define the family of documents being considered.

Thus, the process and device of the invention described herein process documents that are similar but different from a physical point of view, as well as standard, computer generated forms.

The utilization of adaptive reading, in accordance with the invention described herein, makes it possible to define a single document template for an entire family of physical variations with the same logical description. Automatic page analysis technology makes it possible to extract "at a glance" all the fields to be processed without even having learned the type of page used.

The following document types are among the classes of documents to which the invention described herein can be applied:

purchase orders (mail-order sales, etc.), goods exchange declarations (customs), Intrastat and Extrastat documents, tax forms invoices, questionnaires, single social security contribution declarations, financial instrument forms, bank checks, social security statements, legal correspondence and other documents, etc.

Figure 8:
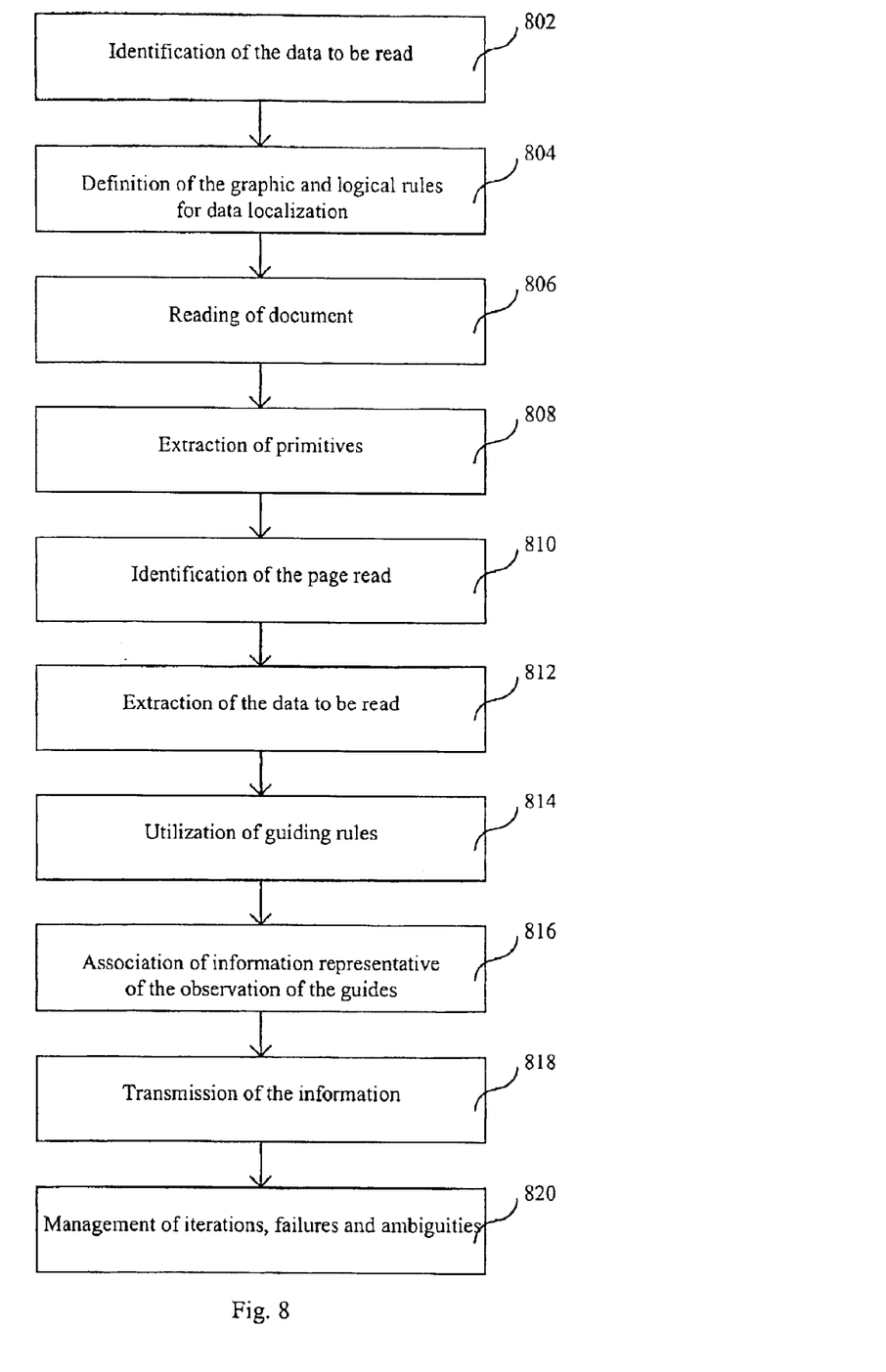
FIG. 8 is a simplified flowchart that represents a fifth way in which the process concerned by the invention described herein is carried out.

In FIG. 8, subsequent to an operation 802 for identifying the document class of the document analyzed, an operation 804 defining the graphical and logical data localization rules is performed. After that, a document-reading step 806 is performed. Document reading consists in digitizing the document and accessing the properties of the electronic image of the document and the objects that represent the image, for example graphic objects such as icons or parts of images, or elements, as understood in SGML and XML languages, which define certain documents as they are generated.

Then the primitives are extracted from the data read during an operation 808. The primitives are primary elements of the document that have elementary properties. For example, if the document is represented by an electronic image, a primitive can be the pixel (or image element) or a connected component, for example a collection of adjacent pixels having the same structural properties, such as the same color. During an operation 810, the page read is identified by implementing the primitives extracted. Then, during an operation 812, the data to be read are extracted from the image of the document, for example by optical character recognition. The guiding rules are used on the data read, including, according to the case, the relative positions, the graphic guides, the heading or the content of the reading zones during an operation 814.

During an operation 816, the information read on the document is associated to information whose signification is deduced from the read information, both of which are related to the reading guides used, by means of a look-up table, for example. Finally, during an operation 818, the information read and the information whose signification is deduced from it are transmitted to a device for processing, storing, and displaying them, etc. as described, for example, with regard to FIGS. 1 and 2.

An operation to manage iterations, failures, and ambiguities 820 enables the process to improve through automatic learning.

What is claimed is:

1. Automatic reading device for a document, equipped with an image capture device which captures an image of the document, the device comprising:

a means of reading in the captured image of the aforementioned document a piece of information that is representative of the image;

a means of detecting at least one reading guide for the aforementioned document in function of the aforementioned representative piece of information, i) each reading guide being associated to visual characteristics of and/or the semantic content of at least one field of the aforementioned document, ii) each reading guide determining a logical structure of the aforementioned document, that logical structure being independent of the localization of the fields of the aforementioned document;

a means of segmenting the image of the aforementioned document into fields, in function of the aforementioned reading guide and the aforementioned logical structure;

a means of associating the fields in the aforementioned document to identifiers whose signification is deduced from read information dependent on the aforementioned reading guide and the aforementioned logical structure;

a means of extracting data from the aforementioned fields of the aforementioned document;

a means of associating the extracted data to the identifiers whose signification is deduced from read data associated to the fields; an a means of transmitting the extracted data and the identifiers whose signification is deduced from read data associated to the extracted data.

2. Reading device in accordance with claim 1, in which each reading guide determines the document family to which the aforementioned document belongs, among a plurality of document families, each document family having a logical structure that is common to all the documents in that family.

3. Reading device in accordance with claim 1, further comprising a means of saving at least one positioning constraint for at least one field of the aforementioned document, a field in which a piece of information might be read, wherein, the means of detection for at least one reading guide is adapted for detecting the compliance with at least one positioning constraint of at least one of the aforementioned fields, and the means of association for the fields is adapted for associating to the data read in a field which complies with one of the aforementioned constraints, an identifier which is representative of that constraint.

4. Reading device in accordance with claim 1, further comprising a means of saving at least one graphic characteristic of at least one field of the aforementioned document, a field in which a piece of information might be read, wherein, the means of detection for at least one reading guide is adapted for detecting at least one field of the aforementioned document that has one of the aforementioned graphic characteristics, and the means of association for the fields is adapted for associating to each field that has one of the aforementioned graphic characteristics, an identifier which is representative of that graphic characteristic.

5. Reading device in accordance with claim 1, further comprising a means of saving at least one heading from at least one field of the aforementioned document, a field in which a piece of information might be read, wherein, the means of detection for at least one reading guide is adapted for reading at least one of the aforementioned headings, and the means of association of the fields is adapted for associating to each field that contains the aforementioned heading, an identifier that is representative of the aforementioned heading.

6. Reading device in accordance with claim 1, further comprising a means of saving a least one information content constraint for at least one field of the aforementioned document, a field in which a piece of information might be read, wherein, the means of detection for at least one reading guide is adapted for reading the content of at least one field of the aforementioned document, and the means of association for the field is adapted for associating to each field that complies with the aforementioned content constraint, an identifier that is representative of that content.

7. Reading device in accordance with claim 1, further comprising a means of saving a least one relation constraint between the respective information contents of at least one plurality of fields of the aforementioned document, fields in which information might be read, wherein, the means of detection for at least one reading guide is adapted for reading the content of at least one plurality of fields of the aforementioned document, and the means of association for the field that is adapted fore associating to each plurality of fields that complies with the aforementioned relation constraint between the respective information contents, a plurality of that are representative of that relation.

8. Automatic reading process for a document comprising a capture step for an image of the document, including:

a reading step in the captured image of the aforementioned document of a piece of information that is representative of the image;

a detection step for at least one reading guide of the aforementioned document in function of the aforementioned representative information, i) each reading guide being associated to the visual characteristics and/or semantic content of at least one field of the aforementioned document, ii) each reading guide determining a logical structure of the aforementioned document, that logical structure being independent of the localization of the fields of the aforementioned document;

a segmentation step of the image of the aforementioned document into fields, in function of the aforementioned reading guide and the aforementioned logical structure;

an association step of the fields in the aforementioned document to identifiers whose signification is deduced from read information dependent on the aforementioned reading guide and the aforementioned logical structure;

an extraction step of the data from the aforementioned fields of the aforementioned document;

an association step of the extracted data to the identifiers whose signification is deduced from read information associated to the fields; and a transmission step of the extracted data and the identifiers whose signification is deduced from read information associated to the extracted data.

9. Reading process in accordance with claim 8, in which each reading guide determines the document family to which the aforementioned document belongs, among a plurality of document families, each document family having a logical structure that is common to all the documents in that family.

10. Reading process in accordance with claim 8, further comprising a saving step of at least one positioning constraint for at least one field of the aforementioned document, a field in which a piece of information might be read, wherein, the detection step of at least one reading guide includes detecting the compliance with at least one positioning constraint of at least one of the aforementioned fields, and the association step of the fields, to the data read in a field which complies with one of the aforementioned constraints includes associating an identifier which is representative of that constraint.

11. Reading process in accordance with claim 8, further comprising a saving step of at least one graphic characteristic of at least one field of the aforementioned document, a field in which a piece of information might be read, wherein,

- the detection step of at least one reading guide includes detecting at least one field of the aforementioned document that has one of the aforementioned graphic characteristics, and
- the association step of the fields, to each field that has one of the aforementioned graphic characteristics, includes associating an identifier which is representative of that graphic characteristic.

12. Reading process in accordance with claim 8, further comprising a saving step of at least one heading from at least one field of the aforementioned document, a field in which a piece of information might be read, wherein,

- the detection step of at least one reading guide includes reading at least one of the aforementioned headings, and
- the association step of the fields, to each field that contains one of the aforementioned headings, includes associating an identifier which is representative of that heading.

13. Reading process in accordance with claim 8, further comprising a saving step of at least one information content constraint for at least one field of the aforementioned document, a field in which a piece of information might be read, wherein,

- the detection step of at least one reading guide includes reading the content of at least one field of the aforementioned document, and
- the association step of the fields, to each field that complies with the aforementioned content constraint, includes associating an identifier that is representative of that content.

14. Reading process in accordance with claim 8, further comprising a saving step of at least one relation constraint between the respective information contents of at least one plurality of fields of the aforementioned document, fields in which information might be read, wherein,

- the detection step of at least one reading guide includes reading the content of at least one plurality of fields of the aforementioned document, and
- the association step of the fields, to each plurality of fields that complies with the aforementioned relation constraint between the respective information contents, includes associating a plurality of identifiers that are representative of that relation.

* * * * *